(12) United States Patent
Deutscher et al.

(10) Patent No.: US 12,488,097 B2
(45) Date of Patent: Dec. 2, 2025

(54) TECHNIQUES FOR SECURING DEPLOYMENT OF INFRASTRUCTURE AS CODE

(71) Applicant: Dazz, Inc., Palo Alto, CA (US)

(72) Inventors: Omer Deutscher, Tel Aviv (IL); Tomer Schwartz, Tel Aviv (IL); Eshel Yaron, Tel Aviv (IL); Barak Bercovitz, Even-Yehuda (IL)

(73) Assignee: Wiz, Inc., New York, NY (US)

( * ) Notice: Subject to any disclaimer, the term of this patent is extended or adjusted under 35 U.S.C. 154(b) by 213 days.

(21) Appl. No.: 17/815,289

(22) Filed: Jul. 27, 2022

(65) Prior Publication Data

US 2024/0037227 A1     Feb. 1, 2024

(51) Int. Cl.
    *G06F 21/55*      (2013.01)

(52) U.S. Cl.
    CPC ...... *G06F 21/554* (2013.01); *G06F 2221/031* (2013.01)

(58) Field of Classification Search
    CPC .......................... G06F 21/554; G06F 2221/031
    See application file for complete search history.

(56) References Cited

U.S. PATENT DOCUMENTS

| | | | |
|---|---|---|---|
| 8,271,653 B2 | 9/2012 | DeHaan | |
| 8,806,425 B1 | 8/2014 | Willis et al. | |
| 9,052,961 B2 * | 6/2015 | Mangtani | G06F 9/5077 |
| 9,449,042 B1 | 9/2016 | Evans et al. | |
| 9,450,783 B2 | 9/2016 | DeHaan | |
| 9,734,349 B1 | 8/2017 | Prafullchandra et al. | |
| 10,108,803 B2 | 10/2018 | Chari et al. | |

(Continued)

FOREIGN PATENT DOCUMENTS

| | | |
|---|---|---|
| EP | 3208996 A1 | 8/2017 |
| EP | 3494506 A1 | 6/2019 |
| WO | 2023067423 A1 | 4/2023 |

OTHER PUBLICATIONS

International Search Report for PCT Application No. PCT/IB2022/059483. The International Bureau of WIPO.

(Continued)

*Primary Examiner* — Daniel B Potratz
*Assistant Examiner* — Faghia Telat Rana
(74) *Attorney, Agent, or Firm* — M&B IP Analysts, LLC

(57) ABSTRACT

A system and method for securing deployment of computing infrastructure resources. A method includes identifying a first set of properties in original definitions of computing infrastructure resources, where each original definition is a definition of a respective computing infrastructure resource; mapping the first set of properties to a second set of properties of universal definition templates in order to determine a matching universal definition template for each original definition, where each of the universal definitions corresponds to a respective type of computing infrastructure resource and is defined in a unified format; transforming the original definitions into universal definitions using the universal definition templates, where transforming each original definition further includes inserting at least one of the first set of properties into the matching universal definition template for the original definition; and managing deployment of the computing infrastructure resources based on the universal definitions.

23 Claims, 4 Drawing Sheets

(56) References Cited

U.S. PATENT DOCUMENTS

| | | | |
|---|---|---|---|
| 11,429,353 B1* | 8/2022 | Liguori | G06F 8/311 |
| 11,893,106 B2 | 2/2024 | Kim et al. | |
| 2003/0131284 A1 | 7/2003 | Flanagan et al. | |
| 2009/0222479 A1 | 9/2009 | Burukhin et al. | |
| 2010/0070448 A1 | 3/2010 | Omoigui | |
| 2013/0167241 A1 | 6/2013 | Siman | |
| 2015/0341214 A1 | 11/2015 | Croy et al. | |
| 2015/0347759 A1 | 12/2015 | Cabrera et al. | |
| 2015/0363197 A1 | 12/2015 | Carback et al. | |
| 2016/0379480 A1 | 12/2016 | OlmstedThompson et al. | |
| 2017/0075749 A1 | 3/2017 | Ambichl et al. | |
| 2017/0185785 A1 | 6/2017 | Vorona et al. | |
| 2017/0249128 A1 | 8/2017 | Fojtik et al. | |
| 2017/0286692 A1 | 10/2017 | Nakajima et al. | |
| 2018/0025160 A1 | 1/2018 | Hwang et al. | |
| 2018/0129479 A1 | 5/2018 | McPherson et al. | |
| 2018/0285199 A1 | 10/2018 | Mitkar et al. | |
| 2018/0321918 A1 | 11/2018 | Mcclory et al. | |
| 2018/0373507 A1 | 12/2018 | Mizrahi et al. | |
| 2019/0007290 A1 | 1/2019 | He et al. | |
| 2019/0068622 A1 | 2/2019 | Lin et al. | |
| 2019/0294477 A1 | 9/2019 | Koppes et al. | |
| 2019/0303579 A1 | 10/2019 | Reddy et al. | |
| 2019/0318312 A1 | 10/2019 | Foskett et al. | |
| 2019/0354389 A1 | 11/2019 | Du et al. | |
| 2020/0097662 A1 | 3/2020 | Hufsmith et al. | |
| 2020/0183766 A1 | 6/2020 | Kumar-Mayernik et al. | |
| 2020/0296117 A1 | 9/2020 | Karpovsky et al. | |
| 2020/0342511 A1 | 10/2020 | Bursey | |
| 2021/0042096 A1* | 2/2021 | White, III | G06F 8/60 |
| 2021/0168165 A1 | 6/2021 | Alsaeed et al. | |
| 2021/0182387 A1 | 6/2021 | Zhu et al. | |
| 2021/0311855 A1 | 10/2021 | Khan et al. | |
| 2021/0382997 A1 | 12/2021 | Yi et al. | |
| 2022/0114023 A1* | 4/2022 | Choksi | G06F 9/5077 |
| 2022/0129539 A1 | 4/2022 | Walsh et al. | |
| 2022/0327220 A1 | 10/2022 | Sharma et al. | |
| 2022/0353341 A1* | 11/2022 | Östrand | H04L 67/51 |
| 2023/0036739 A1 | 2/2023 | Deppisch et al. | |
| 2023/0118065 A1 | 4/2023 | Kumar | |
| 2023/0229781 A1 | 7/2023 | Stolbikov et al. | |
| 2023/0297366 A1 | 9/2023 | Wigglesworth et al. | |
| 2023/0333845 A1 | 10/2023 | Zand et al. | |
| 2025/0013442 A1 | 1/2025 | Hempstead et al. | |

OTHER PUBLICATIONS

Written Opinion of the International Searching Authority for PCT Application No. PCT/IB2022/059483 dated Jan. 8, 2023. The International Bureau of WIPO.

International Search Report, PCT/IB2023/052415; Israel Patent Office, Jerusalem. Dated Jun. 14, 2023.

Written Opinion of the International Searching Authority, PCT/IB2023/052415. Israel Patent Office, Jerusalem. Dated Jun. 14, 2023.

International Search Report for PCT/IB2023/057511, dated Nov. 2, 2023. Searching Authority Israel Patent Office, Jerusalem, Israel.

Written Opinion of the Searching Authority for PCT/IB2023/057511, dated Nov. 2, 2023. Searching Authority Israel Patent Office, Jerusalem, Israel.

Microsoft. "What is Infrastructure as Code?" Article. Jun. 29, 2021. https://docs.microsoft.com/en-us/devops/deliver/what-is-infrastructure-as-code.

Doan TP, Jung S. Davs: Dockerfile Analysis for Container Image Vulnerability Scanning. CMC-Computers Materials & CONTINUA. Jan. 1, 2022;72(1):1699-711. Jan. 1, 2022 (Jan. 1, 2022).

International Search Report for PCT application PCT/IB2023/052413 dated Jun. 12, 2023. The International Bureau of WIPO.

Written Opinion of the Searching Authority for PCT application PCT/IB2023/052413 dated Jun. 12, 2023. The International Bureau of WIPO.

International Search Report for PCT/IB2025/051650, dated May 26, 2025. Searching Authority, Israel Patent Office, Jerusalem, Israel.

Written Opinion of the Searching Authority for PCT/IB2025/051650, dated May 26, 2025. Searching Authority, Israel Patent Office, Jerusalem, Israel.

Alrabaee, "A Survey of Binary Code Fingerprinting Approaches: Taxonomy, Methodologies, and Features", 2022, ACM (Year: 2022).

Liu, "Vfdetect: A Vulnerable Code Clone Detection System Based on Vulnerability Fingerprint", 2017, IEEE (Year: 2017).

* cited by examiner

TECHNIQUES FOR SECURING DEPLOYMENT OF INFRASTRUCTURE AS CODE

TECHNICAL FIELD

The present disclosure relates generally to cybersecurity for computing environments, and more specifically to securing computing environments by managing deployment of computing infrastructure resources.

BACKGROUND

Infrastructure as code (IaC) is a management technique of computing infrastructure in a high-level descriptive model. IaC allows for automating the provisioning of information technology (IT) infrastructure without requiring developers to manually provision and manage servers, operating systems, database connections, storages, and other infrastructure elements when developing, testing, and deploying software applications. The goal of IaC is generally to provision cloud resources from code.

In IaC, an infrastructure may include various computing infrastructure resources such as network adapters, applications, containers, and the like, each of which can be implemented as code. An IaC file is processed or executed in order to provision these computing infrastructure resources within a cloud environment.

Although IaC allows for effective automation of cloud provisioning, automation also carries risks of misconfiguration which could impact the security of the cloud environment. For example, a virtual machine intended for internal use may be exposed to the Internet, or a database that is supposed to be encrypted may be misconfigured such that it is unencrypted. If left undiscovered prior to provisioning, these kinds of misconfigurations may expose cloud resources to cyberattacks.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for securing deployment of computing infrastructure resources. The method comprises: identifying a first plurality of properties in a plurality of original definitions of a plurality of computing infrastructure resources, wherein each original definition is a definition of a respective computing infrastructure resource of the plurality of computing infrastructure resources; mapping the first plurality of properties to a second plurality of properties of a plurality of universal definition templates in order to determine a matching universal definition template for each original definition, wherein each of the plurality of universal definitions corresponds to a respective type of computing infrastructure resource and is defined in a unified format; transforming the plurality of original definitions into a plurality of universal definitions using the plurality of universal definition templates, wherein transforming each original definition further comprises inserting at least one of the first plurality of properties into the matching universal definition template for the original definition; and managing deployment of the plurality of computing infrastructure resources based on the plurality of universal definitions.

Certain embodiments disclosed herein also include a non-transitory computer readable medium having stored thereon causing a processing circuitry to execute a process, the process comprising: identifying a first plurality of properties in a plurality of original definitions of a plurality of computing infrastructure resources, wherein each original definition is a definition of a respective computing infrastructure resource of the plurality of computing infrastructure resources; mapping the first plurality of properties to a second plurality of properties of a plurality of universal definition templates in order to determine a matching universal definition template for each original definition, wherein each of the plurality of universal definitions corresponds to a respective type of computing infrastructure resource and is defined in a unified format; transforming the plurality of original definitions into a plurality of universal definitions using the plurality of universal definition templates, wherein transforming each original definition further comprises inserting at least one of the first plurality of properties into the matching universal definition template for the original definition; and managing deployment of the plurality of computing infrastructure resources based on the plurality of universal definitions.

Certain embodiments disclosed herein also include a system for securing deployment of computing infrastructure resources. The system comprises: a processing circuitry; and a memory, the memory containing instructions that, when executed by the processing circuitry, configure the system to: identify a first plurality of properties in a plurality of original definitions of a plurality of computing infrastructure resources, wherein each original definition is a definition of a respective computing infrastructure resource of the plurality of computing infrastructure resources; map the first plurality of properties to a second plurality of properties of a plurality of universal definition templates in order to determine a matching universal definition template for each original definition, wherein each of the plurality of universal definitions corresponds to a respective type of computing infrastructure resource and is defined in a unified format; transform the plurality of original definitions into a plurality of universal definitions using the plurality of universal definition templates, wherein transforming each original definition further comprises inserting at least one of the first plurality of properties into the matching universal definition template for the original definition; and manage deployment of the plurality of computing infrastructure resources based on the plurality of universal definitions.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
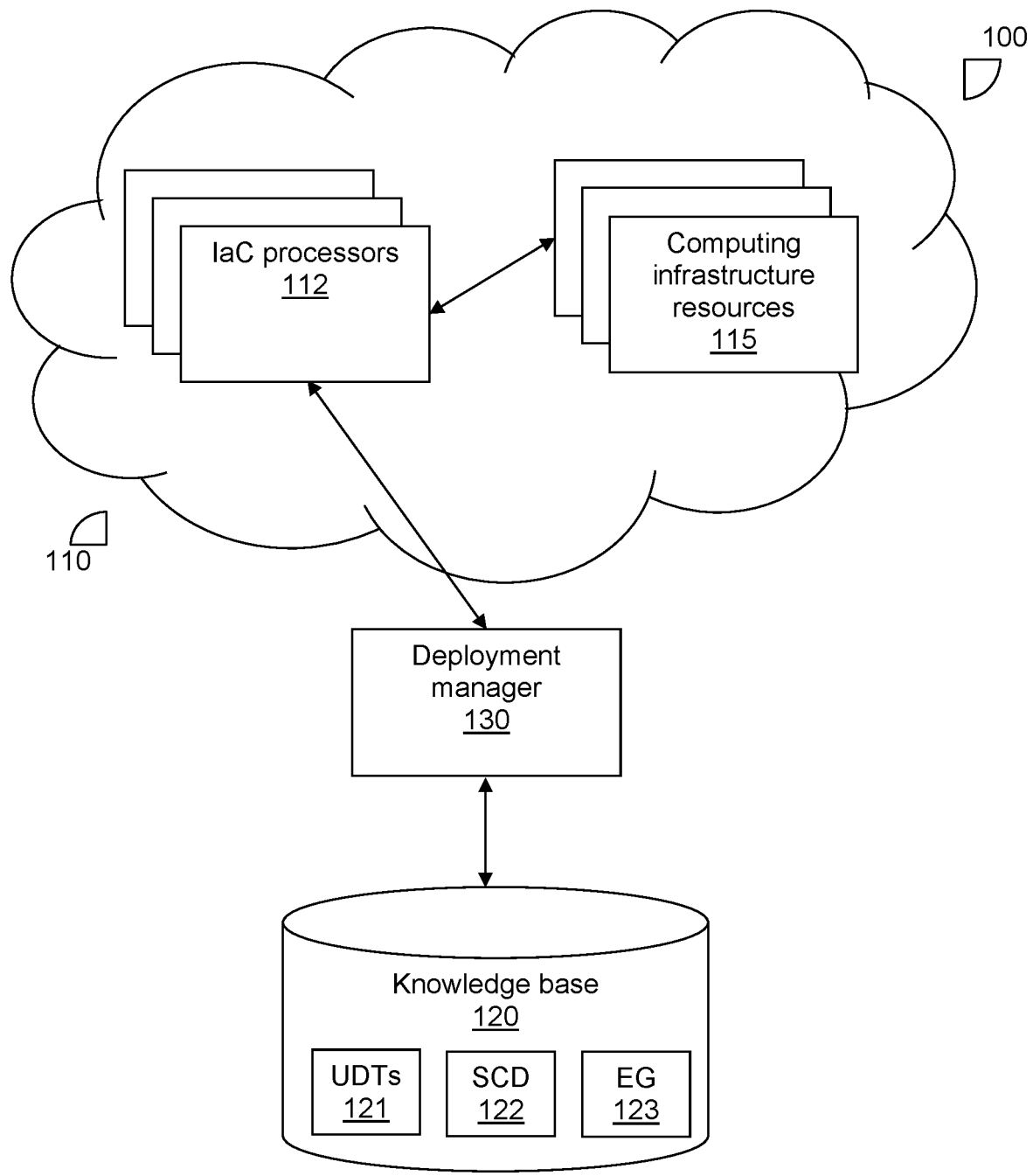
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include methods and systems for detecting misconfigurations in computing environments and, particularly, detecting misconfigurations based on definitions of computing infrastructure resources used for provisioning of such resources. The disclosed embodiments may be utilized to detect misconfigurations in infrastructure as code (IaC) files prior to production (e.g., before cloud resources are provisioned) and to stop IaC files which are misconfigured from proceeding to production, thereby avoiding exposure to cyber threats which would be caused by use of the misconfigured files. Likewise, the disclosed embodiments can be used to validate that IaC files are configured correctly prior to production. Taken together, the disclosed embodiments allow for managing deployment of the computing infrastructure resources in order to ensure secure deployment of computing infrastructure resources by allowing deployment of correctly configured resources and blocking deployment of misconfigured resources.

The disclosed embodiments can be implemented in a cloud-agnostic and IaC-agnostic manner such that misconfigurations can be detected, and correct configurations can be validated regardless of the cloud and IaC technologies being utilized in the software development infrastructure and such that different policies do not need to be defined for each IaC language used for provisioning computing infrastructure resources in the computing environment. Further, the disclosed embodiments allow for defining policies in a universal format with respect to universal computing infrastructure resource definitions such that the policies can be enforced regardless of the computing languages being used to realize the computing environment.

In an embodiment, universal definition templates of various types of computing infrastructure resources are created as representations of different types of computing infrastructure resources including properties which collectively define these different types of computing infrastructure resources. Original definitions of specific computing infrastructure resources are transformed into respective universal definitions by matching properties indicated in the original definitions to properties in the universal definition templates in order to identify a universal definition template for each original definition and inserting one or more properties indicated by each original definition into its respective matching universal definition template.

Based on the universal definitions of the computing infrastructure resources and applicable policies for the cloud infrastructure, one or more misconfigurations are detected, correct configurations are validated, or both. Remedial actions such as, but not limited to, adding, removing, or modifying code of misconfigured computing infrastructure resources, may be performed in order to attempt to correct the configuration of those misconfigured computing infrastructure resources. Deployment of the computing infrastructure resources is managed based on whether each resource is configured correctly. For example, misconfigured computing infrastructure resources are prevented from deploying while correctly configured resources (or groups of resources for which no misconfigurations were detected) are allowed to deploy.

In a further embodiment, transforming the original definitions of computing infrastructure resources into universal definitions includes applying a policy engine to those original definitions. Properties are identified in the original definitions. The identified properties are semantically analyzed with respect to known semantic concepts representing potential properties of computing infrastructure resources that, in combination, may uniquely identify a type of the computing infrastructure resource. Based on the results of the semantic analysis, the properties are mapped to properties indicated in universal definition templates of potential types of computer resources. Based on the mapping, an applicable universal definition template may be determined for each computing infrastructure resource represented by one of the original definitions. Each original definition is transformed into a universal definition for the computing infrastructure resource by inserting one or more properties indicated in the original definition into the universal definition template determined for that computing infrastructure resource.

The disclosed embodiments may further be useful in allowing for applying policies to hybrid environments which utilize multiple different forms of cloud computing and/or IaC technologies which utilize definitions for provisioning of resources in different languages. More specifically, policies can be applied to such differing language definitions without needing to fully reevaluate and reformat all of those policies in accordance with the different languages used.

Moreover, transforming definitions of computing infrastructure resources into universal definitions as described herein allows for defining policies with respect to types of computing infrastructure resources rather than requiring defining policies with respect to particular computing infrastructure resources. As a non-limiting example, a policy that requires no publicly accessible unencrypted cloud storages may be defined with respect to universal definitions of cloud storage infrastructure resources (i.e., computing infrastructure resources utilized for cloud storage) based on properties of those cloud storage infrastructure resources (i.e., properties indicating whether each cloud storage is publicly accessible). In contrast, existing solutions would require defining such a policy with respect to specific storage service(s) and the specific cloud storages referred to by those services.

FIG. 1 shows an example network diagram 100 utilized to describe the various disclosed embodiments. The example network diagram 100 illustrates a cloud computing platform 110, a knowledge base 120, and a deployment manager 130. The cloud computing platform 110 may be realized via one or more networks such as, but not limited to, a wireless, cellular or wired network, a local area network (LAN), a wide area network (WAN), a metro area network (MAN), the Internet, the worldwide web (WWW), similar networks, and any combination thereof.

The cloud computing platform 110 includes IaC processors 112 and one or more cloud computing infrastructure resources 115. The IaC processors 112 may be configured to deploy and host web applications uploaded to the cloud computing platform 110 by one or more software developer devices (not shown). To this end, the IaC processors 112 include IaC definition files (not shown) including original definitions of the cloud computing infrastructure resources 115 and rules for provisioning the cloud computing infrastructure resources 115. The cloud computing infrastructure resources 115 include computing components realized as code and may include, but are not limited to, network adapters, software applications, containers, virtual machines, repositories, databases, combinations thereof, and the like.

The knowledge base 120 stores data used for managing deployment of computing infrastructure resources via misconfiguration detection and/or validation. Such data may include, but is not limited to, a set of universal definition templates (UDTs) 121, a semantic concepts dictionary (SCD) 122, and an entity graph (EG) 123.

The universal definition templates 121 represent different types of computing infrastructure resources using properties expressed in a universal format. Accordingly, the universal definitions can be compared to original definitions of particular computing infrastructure resources with respect to these properties in order to determine the type of each of those computing infrastructure resources regardless of the manner in which the type of those computing infrastructure resources is expressed in the original definition. As a non-limiting example, the universal definition templates 121 may include definitions for types of computing infrastructure resources such as "network interface," "virtual machine," and "network adapter," each expressed using a respective combination of properties expressed in a universal format. The universal definition templates 121 may be matched to properties indicated in original definitions of computing infrastructure resources and used to transform matching original definitions as described herein.

The semantic concepts dictionary 122 includes entries defining semantic concepts indicating properties of different types of entities such as, but not limited to, configurations, encryptions, backups, connections to external systems, connections to networks, connections to storage devices, memory size, geographic region, combinations thereof, and the like. These semantic concepts may be utilized to transform original definitions of computing infrastructure resources into universal definitions as described further below.

The entity graph 123 is a graph linking nodes representing entity-identifying values such as, but not limited to, resource names, unique identifiers, and the like. The entities represented by such values may include, but are not limited to, computing infrastructure resources among the computing infrastructure resources 115.

The entity graph 123 may provide an end-to-end view of all domains of the software infrastructure including connections between components of those domains, thereby establishing potential connections between any two given components in the software infrastructure and their respective domains. To this end, the entity graph 123 at least includes nodes representing the cloud computing infrastructure resources 115 as well as edges representing connections between those cloud computing infrastructure resources 115.

The entity graph 123 includes schematic data linking different domains and demonstrating linkages within each domain. In some implementations, the domains may include domains representing various layers of the software infrastructure as well as domains representing event logic components (e.g., policies, code defining business logic, queries, etc.) related to cybersecurity events.

In an embodiment, the deployment manager 130 is configured to analyze original definitions of the cloud computing infrastructure resources 115 stored in the IaC processors 112 and to transform those original definitions into universal definitions using the universal definition templates 121. Based on the universal definitions and in accordance with one or more applicable policies for the cloud computing infrastructure resources 115, the deployment manager 130 is configured to detect one or more misconfigurations. In a further embodiment, the deployment manager 130 may be configured to remediate such misconfigurations, for example, by removing code, preventing deployment of one or more of the cloud computing infrastructure resources 115 (e.g., preventing deployment during production in the continuous integration/continuous deployment pipeline), severing connections among the cloud computing infrastructure resources 115, isolating one or more of the cloud computing infrastructure resources 115, generate alerts, combinations thereof, and the like.

In a further embodiment, the deployment manager 130 is configured to manage deployment of computing infrastructure resources in the cloud computing platform 110 based on the universal definitions. To this end, in some implementations, the deployment manager 130 may communicate with the IaC processors 112 in order to, for example, control which computing infrastructure resources are deployed among the computing infrastructure resources 115 by determining whether those computing infrastructure resources are correctly configured based on their respective universal definitions and allowing or preventing deployment depending on whether each computing infrastructure resource to be deployed is correctly configured.

Various example universal definition templates follow. More specifically, the following non-limiting examples demonstrate example sets of properties used for respective types of computing infrastructure resources (e.g., a virtual machine, a cloud storage infrastructure resource, a cryptographic key, a firewall rule, and a container repository). Other types of computing infrastructure resources and/or combinations of properties may be equally utilized without departing from the scope of the disclosure.

Example 1: Virtual Machine—Properties Include

1. Does it have internet access (yes/no)?
2. A list of network interfaces attached
3. Geographic region of the virtual machine
4. Virtual processor type
5. List of attached virtual storage devices.
6. Memory size of the virtual machine Example 2: Cloud Storage Infrastructure Resource—Properties Include 1. Does it have a backup?
2. Does it have encryption?
3. Can it be accessed from the internet?
4. Is any access to the resource being audit logged?
5. Does it have versioning enabled?

Example 3: Cryptographic Key—Properties Include

1. Allowed actions of the key (encrypt/decrypt/digitally sign, etc.)
2. Key rotation configuration
3. Symmetric or asymmetric key?

Example 4: Firewall Rule—Properties Include

1. Network protocol allowed
2. Destination and source IP addresses
3. Destination and source TCP port
4. Action (allow/deny the network traffic)
5. Direction (inbound/outbound traffic)
6. Rule priority (in relation to other rules)

Example 5: Container Repository—Properties Include

1. Is it a public repository?
2. Are containers encrypted at rest?
3. Is mutation for container tags allowed?

It should be noted that the example network diagram depicted in FIG. 1 illustrates a particular arrangement of communicating components merely for simplicity purposes, but that the disclosed embodiments are equally applicable to different cloud computing configurations. As a non-limiting example, the knowledge base 120, the deployment manager 130, or both, may be deployed in the cloud computing platform 110 without departing from the scope of the disclosure. Additionally, the computing infrastructure resources 115 may be deployed in an infrastructure other than a cloud computing infrastructure such as, but not limited to, an on-premises infrastructure. As another non-limiting example, the IaC processors 112 may be deployed outside of the cloud computing platform 110 and configured to upload computing infrastructure resources to the cloud computing platform 110

Figure 2:
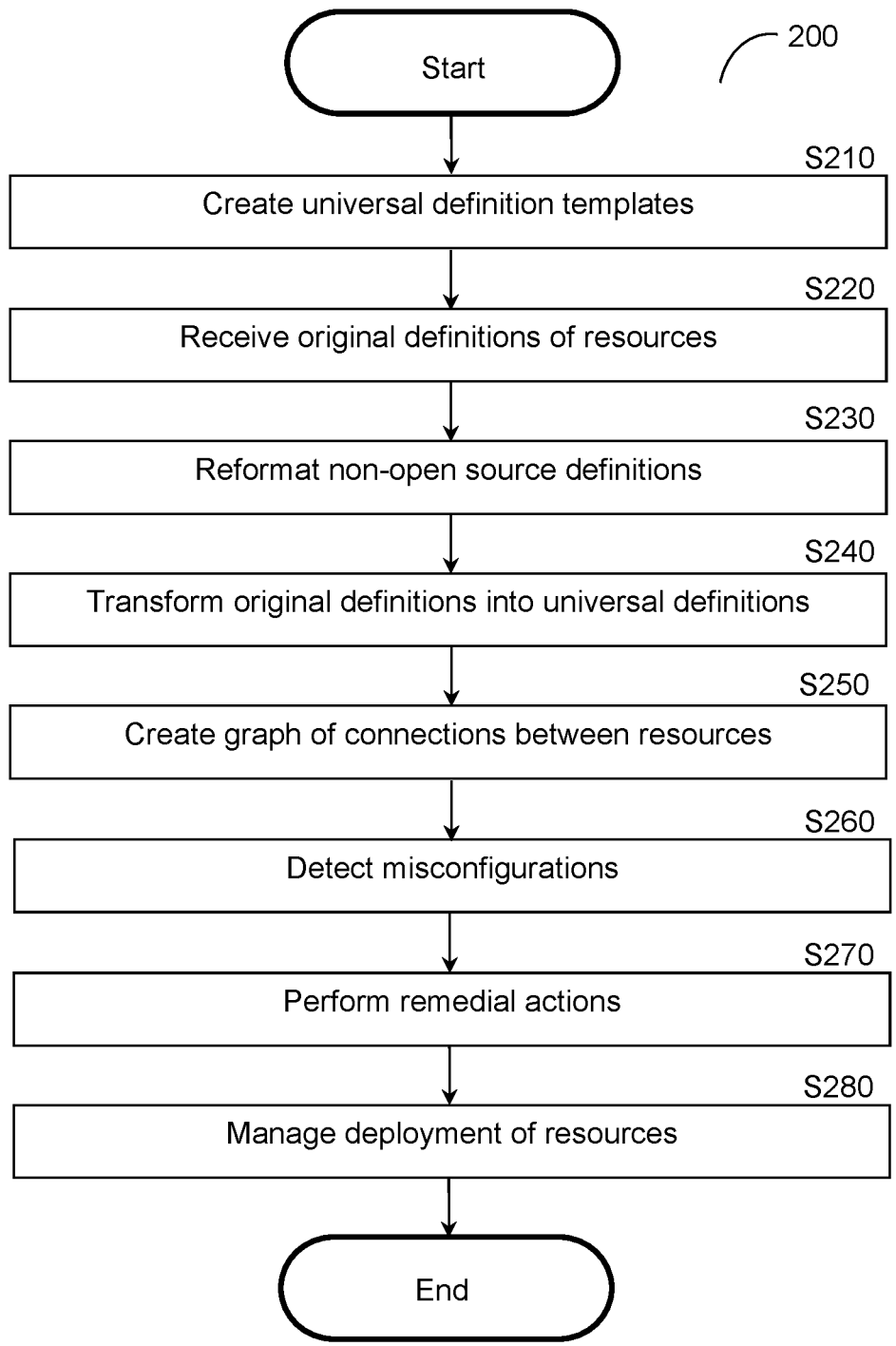
FIG. 2 is a flowchart illustrating a method for managing deployment of computing infrastructure resources according to an embodiment.

FIG. 2 is a flowchart 200 illustrating a method for managing deployment of computing infrastructure resources according to an embodiment. In an embodiment, the method is performed by the deployment manager 130, FIG. 1.

At S210, a set of universal definition templates is created. The universal definition templates are created in a unified format and is expressed using respective sets of properties. Each universal definition template represents a respective type of computing infrastructure resource such as, but not limited to, network interface, software application, virtual machine, software container, network adapter, database, and the like. Each universal definition template may contain one or more fields or other portions into which values representing specific properties of computing infrastructure resources may be inserted in order to transform an original definition into a universal definition formatted in accordance with the universal definition template.

In some embodiments, the set of universal definition templates may be realized as a tree or graph where properties included in universal definitions may be inherited between universal definitions. By inheriting properties in this manner, properties which are used in multiple templates do not need to be duplicated in each of those templates. This, in turn, allows for reducing the amount of memory used for storing properties as well as for increasing the speed of traversal and template matching based on these properties. To this end, in an embodiment, S210 may further include creating such a tree or graph.

The universal definition templates represent various types of computing infrastructure resources which may be represented in respective IaC languages (e.g., proprietary IaC languages utilized by different IaC software providers). By transforming original definitions into universal definitions using these templates, policies may be applied based on types of computing infrastructure resources regardless of how those types of computing infrastructure resources are expressed in their native IaC languages. To this end, the universal definition templates may be created based on properties included in different definitions of the same types of computing infrastructure resources. As a non-limiting example, an original definition may indicate that a given computing infrastructure resource is an EC2 (a proprietary type of computing infrastructure resource) instance, and an applicable universal definition (i.e., a non-proprietary explanation of the type of computing infrastructure resource) may be "virtual machine" created using a universal definition template associated with the semantic concept "virtual machine."

In an embodiment, S210 may further include storing the created universal definition templates in a knowledge base (e.g., the knowledge base 120, FIG. 1).

At S220, original definitions of computing infrastructure resources are received. The original definitions are each written in an IaC language that may be a proprietary language or otherwise is not universally used across different IaC technologies.

At optional S230, non-open source definitions among the received original definitions are reformatted into a normalized format. To this end, S230 may include applying an evaluator tool that is configured to take an input definition and output a data-interchange format document in a format of a recognized data-interchangeable language. As a non-limiting example, a JSON file may be output. The evaluator may further be configured to parse the original definition to identify expressions therein and to interpret the identified expressions with respect to the recognized data-interchangeable language, with the output being a data-interchangeable format document (e.g., a text file) in the data-interchangeable language.

As noted above, some or all of the original definitions may be expressed imperatively, i.e., in an imperative IaC language. When an original definition is expressed in an imperative IaC language, the definitions may be reformatted based on a control flow analysis performed on the original definition. Commands identified using the control flow analysis may be parsed with respect to a data-interchangeable language, and the resulting normalized original definition is defined using the data-interchangeable language. Performing the control flow analysis may include, but is not limited to, statically analyzing IaC files in order to identify commands indicated therein. Alternatively, the definitions may be reformatted based on analysis of results computed based on execution of an IaC processor or an IaC script related to the IaC files without necessarily provisioning the IaC files.

At S240, the original definitions are transformed into universal definitions. In an embodiment, the original definitions may be transformed using a translator program that is configured to map properties in an original definition to properties of universal definition templates via semantic analysis, and to use that mapping in order to classify each original definition into a respective type of computing infrastructure resource via association with a matching universal definition template. The original definition may be transformed into the universal definition by inserting values representing properties from the original definition into the matching universal definition template.

Figure 3:
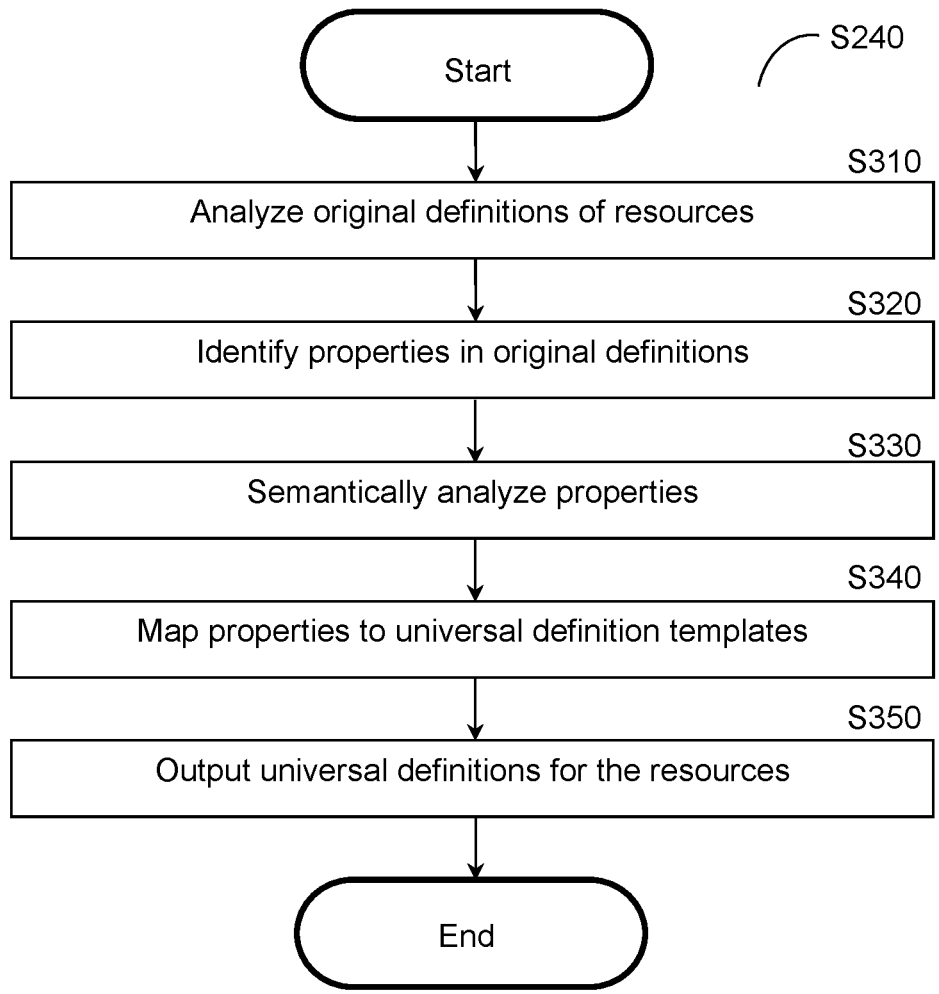
FIG. 3 is a flowchart illustrating a method for transforming definitions of cloud resources according to an embodiment.

In an embodiment, the transformation of the definitions is performed as described further with respect to FIG. 3. FIG. 3 is a flowchart S240 illustrating a method for transforming definitions of cloud resources according to an embodiment.

At S310, original definitions of computing infrastructure resources are analyzed. In an embodiment, S310 includes applying a policy engine to each original definition. Each original definition is expressed in an original IaC language.

In an embodiment, each original definition may be expressed in a declarative IaC language or in an imperative IaC language. A declarative IaC language is used to define resources in terms of the resulting resources to be deployed, while an imperative IaC language is used to define resources in terms of the commands to be utilized to deploy the resources which will result in the desired resources. The analysis performed at S310 may depend on the type of language (i.e., declarative or imperative) in which each original definition is expressed. More specifically, when the original definition for a resource is expressed in an imperative IaC language, S310 may further include performing control flow analysis on the imperative IaC language original definition in order to determine which resources are to be deployed.

In another embodiment, when the original definition is expressed in an imperative IaC language, S310 may further include instrumenting an IaC processor or IaC script corresponding to the original definition and analyzing the results of the execution. Instrumenting the IaC processor or IaC script (also referred to instrumenting IaC instructions of the IaC processor or IaC script) includes, but is not limited to, executing instructions of the IaC processor or IaC script and monitoring the execution for potential errors or abnormalities. The instrumented instructions may be executed in a controlled environment, e.g., an environment where the interactions with external systems and code (i.e., external to the controlled environment) is impossible, limited, or otherwise restricted to minimize harm that may come from executing untrusted code. In a further embodiment, instrumenting the IaC processor or script may also include replacing a backend of such processor or script with mock code and analyzing the output.

At S320, properties in the original definitions are identified. The properties include, but are not limited to, cybersecurity-related properties, at least some of which may be used to collectively uniquely identify a type of computing infrastructure resource. To this end, the properties may include, but are not limited to, configuration properties, encryption properties, backup properties, properties indicating connections to external systems, combinations thereof, and the like. The properties may further include other data describing or identifying computing resources such as, but not limited to, tags.

The properties may further include properties which are not necessarily used to determine a type of computing infrastructure resource but, instead, relate to a configuration which may differ even between the same types of computing infrastructure resource. As a non-limiting example, such a property for a virtual machine (VM) may be a property indicating whether the VM has Internet access, which some VMs may have and others may not.

The properties may be identified using a policy engine configured according to an open policy engine language. As a non-limiting example, a policy engine defined via the open source language Rego may be utilized to identify the properties. Specifically, the properties may be identified as configuration properties, effects on a computing environment when the resource is deployed in the computing environment (e.g., resources created by the computing infrastructure resource, modifications to the computing environment made by the resource, etc.), both, and the like. These configurations and effects can be encoded into a single, unified format, in order to create the universal definitions of computing infrastructure resources.

Further, as noted above, for original definitions expressed in an imperative IaC language that are analyzed using control flow analysis, identifying the properties of the corresponding computing infrastructure resource may further include analyzing the commands indicated in the original definition in order to identify properties of the computing infrastructure resources deployed as a result of those commands. Alternatively, identifying the properties for an imperative IaC language original definition may include instrumenting instructions of a corresponding IaC processor or script for the original definition and analyzing the results of such execution (e.g., the outputs and instrumentation logs resulting from instrumenting the instructions).

At S330, the identified properties are semantically analyzed. In an embodiment, S330 includes comparing the identified properties to predefined semantic concepts of known potential properties for computing infrastructure resources. More specifically, the known potential properties may be properties indicated or otherwise represented in universal definition templates. The semantic concepts may be semantic concepts included in a semantic concepts dictionary such as the semantic concepts dictionary 122, FIG. 1.

At S340, the properties are mapped to universal definition templates based on the semantic analysis. That is, each property identified in one of the original definitions is mapped to a respective property represented in one or more of the universal definition templates. Accordingly, the mapping can be used to determine a matching universal definition template for a computing infrastructure resource based on a combination of the identified properties mapped to the properties of that universal definition template. In an embodiment, when the semantic analysis yields an identification of a type of the computing resource, a universal definition template associated with the identified type of the computing resource may be used to map the properties to the respective universal definition template.

At S350, a universal definition is output for each of the computing infrastructure resources based on the mapping. In an embodiment, S350 includes inserting one or more properties represented in the original definition of each computing infrastructure resource into respective fields of the matching universal definition template determined for the computing infrastructure resource at S340. The result of S350 is a universal definition for each of the computing infrastructure resources expressed in a unified format, which allows for application of policies created using the unified format.

As a non-limiting example, for the Cryptographic Key computing infrastructure resource universal definition depicted above in Example 3, an example universal definition may include the following properties represented in a unified format:

1. Allowed actions=encrypt, sign
2. Key rotation configuration=rotated every 24 hours
3. Symmetric?=true Returning to FIG. 2, at optional S250, a graph is created. The graph at least includes a mapping of the computing infrastructure resources among the computing infrastructure resources represented by the original definitions. In some embodiments, the graph may be an entities graph (e.g., the entities graph 123, FIG. 1) representing entities in various domains of the software infrastructure of a computing environment (such as the cloud computing environment 110, FIG. 1).

At S260, one or more misconfigurations are detected with respect to the computing infrastructure resources based on the universal definitions. The detected misconfigurations may be indicative of potential cybersecurity vulnerabilities to which a computing environment is or would be exposed via its computing infrastructure resources. Additionally or alternatively, the detected misconfigurations may relate to other kinds of undesirable configurations such as, but not limited to, configurations which fail compliance requirements or other requirements on the computing environment which are not strictly related to cybersecurity.

More specifically, one or more policies, defined with respect to properties of universal definition templates, are applied in order to determine whether the transformed definitions of the computing infrastructure resources demonstrate any misconfigurations. In a further embodiment, the misconfigurations may be detected based further on connections between the computing infrastructure resources (e.g., connections indicated in the graph created at S260). Using such connections may further aid in detecting misconfigurations before computing infrastructure resources are provisioned, thereby allowing for proactively protecting the computing environment.

At S270, one or more remedial actions may be performed with respect to the detected misconfigurations. The remedial actions may include, but are not limited to, adding, removing, modifying code of misconfigured computing infrastructure resources, altering provisioning of the computing infrastructure resources, severing connections between computing infrastructure resources, halting deployment of the computing environment, generating alerts (e.g., an alert warning of the misconfiguration), combinations thereof, and the like. Code may be added when, for example, the misconfigured computing infrastructure resource has is configured in a manner that is too lax (for example, as defined by a security policy), and the added code may increase the security of the computing infrastructure resource (e.g., by adding a security setting to the computing infrastructure resource).

At S280, deployment of the computing infrastructure resources is managed. Managing deployment of the computing infrastructure resources may include, but is not limited to, controlling deployment of the computing infrastructure resources by allowing computing infrastructure resources to be deployed (e.g., by uploading to a computing environment), by preventing computing infrastructure resources from being deployed, a combination thereof, and the like.

More specifically, in an embodiment, misconfigured computing infrastructure resources (e.g., computing infrastructure resources having misconfigurations detected at S260) are prevented from being deployed while correctly configured computing infrastructure resources are allowed to be deployed. In a further embodiment, if a group of computing infrastructure resources is to be deployed together (e.g., at the same time or otherwise as part of the same deployment), then deployment of all of the resources in the group may be blocked if misconfigurations are detected for any of the resources in the group. Such a group of resources may be a predesignated group of resources for a given deployment.

In another embodiment, S280 includes validating a configuration of some or all of the computing infrastructure resources based on their respective universal definition. In particular, computing infrastructure resources for which misconfigurations were detected and remediated at S260 and S270 may be validated to confirm whether those computing infrastructure resources are now correctly configured. The validation may include, but is not limited to, applying one or more of the policies discussed above with respect to S260. Validated computing infrastructure resources may include computing infrastructure resources for which no misconfigurations are detected during the validation.

Alternatively or in combination, managing deployment of the computing infrastructure resources may include reconfiguring the computing infrastructure resources that are already deployed in the computing environment. As non-limiting examples, reconfiguring the computing infrastructure resources may include adding or removing code, severing connections with certain other computing infrastructure resources, combinations thereof, and the like.

Figure 4:
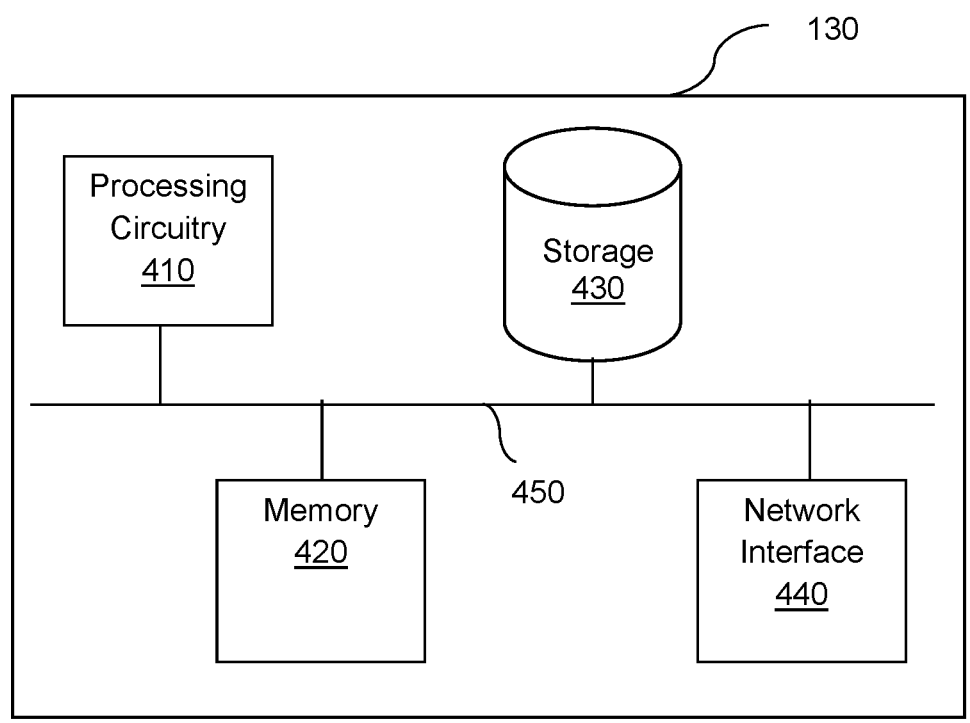
FIG. 4 is a schematic diagram of a deployment manager according to an embodiment.

FIG. 4 is an example schematic diagram of a deployment manager 130 according to an embodiment. The deployment manager 130 includes a processing circuitry 410 coupled to a memory 420, a storage 430, and a network interface 440. In an embodiment, the components of the deployment manager 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the deployment manager 130 to communicate with, for example, the knowledge base 120, the IaC processors 112, and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for securing deployment of computing infrastructure resources, comprising:
   identifying a first plurality of properties in a plurality of original definitions of a plurality of computing infrastructure resources, wherein each original definition is a definition of a respective computing infrastructure resource of the plurality of computing infrastructure resources;
   mapping the first plurality of properties to a second plurality of properties of a plurality of universal definition templates in order to determine a matching universal definition template for each original definition, wherein each of the plurality of universal definitions corresponds to a respective type of computing infrastructure resource and is defined in a unified format;
   transforming the plurality of original definitions into a plurality of universal definitions using the plurality of universal definition templates, wherein transforming each original definition further comprises inserting at least one of the first plurality of properties into the matching universal definition template for the original definition; and
   managing deployment of the plurality of computing infrastructure resources based on the plurality of universal definitions.

2. The method of claim 1, further comprising:
   semantically analyzing the first plurality of properties, wherein the first plurality of properties is mapped to the second plurality of properties based on the semantic analysis.

3. The method of claim 2, wherein the first plurality of properties is semantically analyzed with respect to a plurality of predefined semantic concepts representing a plurality of potential properties of computing infrastructure resources represented in the plurality of universal definition templates.

4. The method of claim 1, further comprising:
   creating a graph of connections between the plurality of computing infrastructure resources based on the plurality of universal definitions, wherein the deployment of the plurality of computing infrastructure resources is managed based further on the graph.

5. The method of claim 1, wherein managing deployment of the plurality of computing infrastructure resources further comprises:
   applying at least one policy defining misconfigurations with respect to properties expressed in the unified format.

6. The method of claim 1, further comprising:
   reformatting at least one original definition of the plurality of original definitions into a normalized original definition.

7. The method of claim 6, wherein reformatting each of the at least one original definition further comprises:
   parsing the original definition to identify a plurality of expressions; and
   interpreting the plurality of expressions with respect to a data-interchangeable language, wherein the normalized original definition is defined using the data-interchangeable language.

8. The method of claim 6, wherein reformatting each of the at least one original definition further comprises:
   performing control flow analysis on the original definition in order to identify a plurality of commands; and
   interpreting the plurality of commands with respect to a data-interchangeable language, wherein the normalized original definition is defined using the data-interchangeable language.

9. The method of claim 1, wherein reformatting each of the at least one original definition further comprises:

instrumenting infrastructure as code (IaC) instructions corresponding to each of the at least one original definition; and analyzing outputs and instrumentation logs of the IaC instructions corresponding to each of the at least one original definition, wherein each of the at least one original definition is reformatted based on the analysis of the outputs and instrumentation logs.

10. The method of claim 1, further comprising:
preventing deployment of at least one of the plurality of computing infrastructure resources in a cloud environment based on the plurality of universal definitions.

11. The method of claim 1, further comprising:
performing at least one remedial action with respect to at least one of the plurality of computing infrastructure resources based on the plurality of universal definitions.

12. A non-transitory computer readable medium having stored thereon instructions for causing a processing circuitry to execute a process, the process comprising:
identifying a first plurality of properties in a plurality of original definitions of a plurality of computing infrastructure resources, wherein each original definition is a definition of a respective computing infrastructure resource of the plurality of computing infrastructure resources;
mapping the first plurality of properties to a second plurality of properties of a plurality of universal definition templates in order to determine a matching universal definition template for each original definition, wherein each of the plurality of universal definitions corresponds to a respective type of computing infrastructure resource and is defined in a unified format;
transforming the plurality of original definitions into a plurality of universal definitions using the plurality of universal definition templates, wherein transforming each original definition further comprises inserting at least one of the first plurality of properties into the matching universal definition template for the original definition; and
managing deployment of the plurality of computing infrastructure resources based on the plurality of universal definitions.

13. A system for securing deployment of computing infrastructure resources, comprising:
a processing circuitry; and
a memory, the memory containing instructions that, when executed by the processing circuitry, configure the system to:
identify a first plurality of properties in a plurality of original definitions of a plurality of computing infrastructure resources, wherein each original definition is a definition of a respective computing infrastructure resource of the plurality of computing infrastructure resources;
map the first plurality of properties to a second plurality of properties of a plurality of universal definition templates in order to determine a matching universal definition template for each original definition, wherein each of the plurality of universal definitions corresponds to a respective type of computing infrastructure resource and is defined in a unified format;
transform the plurality of original definitions into a plurality of universal definitions using the plurality of universal definition templates, wherein transforming each original definition further comprises inserting at least one of the first plurality of properties into the matching universal definition template for the original definition; and
manage deployment of the plurality of computing infrastructure resources based on the plurality of universal definitions.

14. The system of claim 13, wherein the system is further configured to:
semantically analyze the first plurality of properties, wherein the first plurality of properties is mapped to the second plurality of properties based on the semantic analysis.

15. The system of claim 14, wherein the first plurality of properties is semantically analyzed with respect to a plurality of predefined semantic concepts representing a plurality of potential properties of computing infrastructure resources represented in the plurality of universal definition templates.

16. The system of claim 13, wherein the system is further configured to:
create a graph of connections between the plurality of computing infrastructure resources based on the plurality of universal definitions, wherein the deployment of the plurality of computing infrastructure resources is managed based further on the graph.

17. The system of claim 13, wherein the system is further configured to:
apply at least one policy defining misconfigurations with respect to properties expressed in the unified format.

18. The system of claim 13, wherein the system is further configured to:
reformat at least one original definition of the plurality of original definitions into a normalized original definition.

19. The system of claim 18, wherein the system is further configured to:
parse each original definition to identify a plurality of expressions; and
interpret the plurality of expressions identified for each original definition with respect to a data-interchangeable language, wherein the normalized original definition is defined using the data-interchangeable language.

20. The system of claim 18, wherein the system is further configured to:
perform control flow analysis on the original definition in order to identify a plurality of commands; and
interpret the plurality of commands with respect to a data-interchangeable language, wherein the normalized original definition is defined using the data-interchangeable language.

21. The system of claim 13, wherein the system is further configured to:
execute infrastructure as code (IaC) instructions corresponding to each of the at least one original definition; and
analyze an output of the execution of the IaC instructions corresponding to each of the at least one original definition, wherein each of the at least one original definition is reformatted based on the analysis of the output of the execution of the IaC instructions corresponding to the original definition.

22. The system of claim 13, wherein the system is further configured to:
prevent deployment of at least one of the plurality of computing infrastructure resources in a cloud environment based on the plurality of universal definitions.

23. The system of claim 13, wherein the system is further configured to:

perform at least one remedial action with respect to at least one of the plurality of computing infrastructure resources based on the plurality of universal definitions.

* * * * *